Nov. 28, 1961    A. J. CERVENKA ET AL    3,010,281
TOROIDAL COMBUSTION CHAMBER
Filed Dec. 24, 1957    2 Sheets-Sheet 1

INVENTORS
ADOLPH J. CERVENKA
ARTHUR G. THORP, II
BY
ATTORNEY

Nov. 28, 1961  A. J. CERVENKA ET AL  3,010,281
TOROIDAL COMBUSTION CHAMBER
Filed Dec. 24, 1957  2 Sheets-Sheet 2

INVENTORS
ADOLPH J. CERVENKA
ARTHUR G. THORP, II
BY
Victor D. Behn
ATTORNEY

United States Patent Office 3,010,281
Patented Nov. 28, 1961

3,010,281
TOROIDAL COMBUSTION CHAMBER
Adolph J. Cervenka, Princeton, and Arthur G. Thorp II, Pennington, N.J., assignors, by mesne assignments, to the United States of America as represented by the Secretary of the Army
Filed Dec. 24, 1957, Ser. No. 705,072
1 Claim. (Cl. 60—39.37)

This invention relates to gas turbine engines and is particularly directed to the combustion chamber construction of such an engine.

In the usual gas turbine engine the combustion chamber is arranged for gas flow in an axial direction therethrough. An object of the present invention comprises the provision of a novel gas turbine engine having an annular combustion chamber structure in which the general direction of gas flow is in a circumferential direction.

A further object of the invention comprises the provision of a gas turbine engine having such a circumferential-flow annular combustion chamber in combination with a centrifugal compressor and/or a centripetal turbine.

Other objects of the invention will become apparent upon reading the annexed detailed description in connection with the drawing in which.

Figure 1:
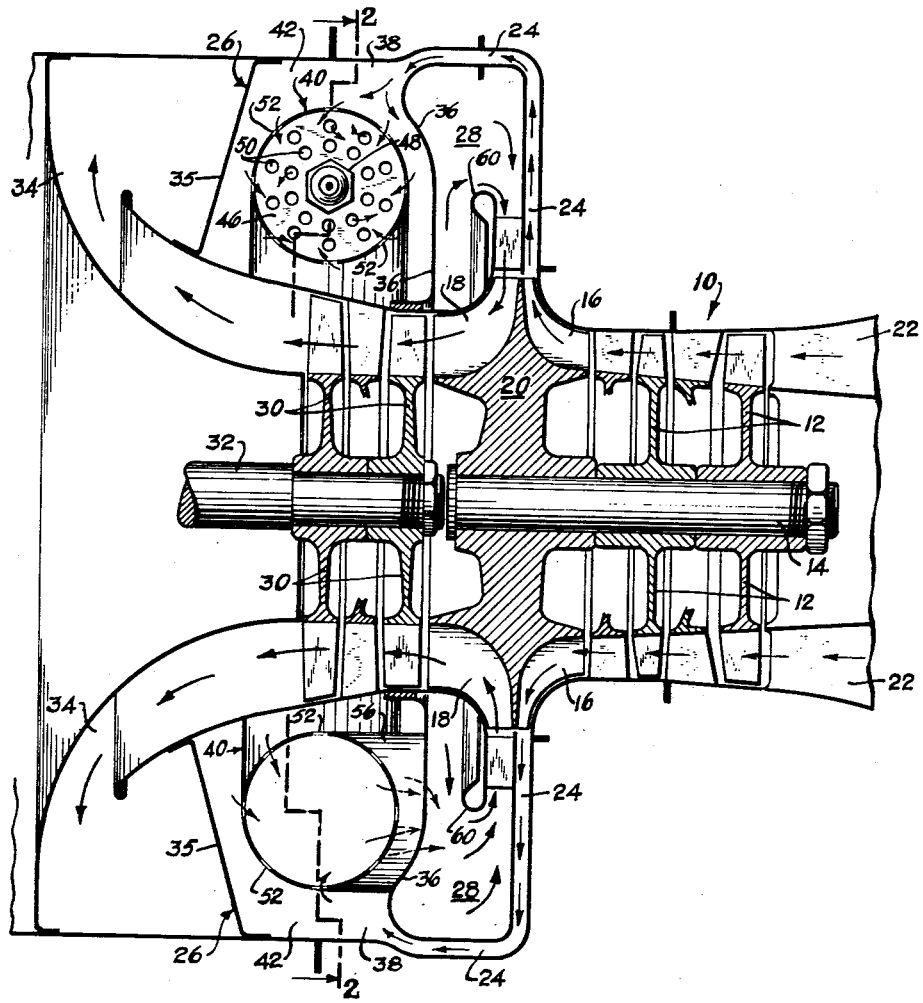
FIG. 1 is an axial sectional view taken along line 1—1 of FIG. 2 of a gas turbine engine embodying the invention.

Referring to the drawing, a gas turbine engine 10 is illustrated as comprising a multi-stage axial-flow compressor 12 secured to a rotor shaft 14. Also mounted on the shaft 14, downstream of the axial flow compressor 12, is a centrifugal compressor 16 and a centripetal turbine 18, the centrifugal compressor 16 and centripetal turbine 18 being mounted in back-to-back relation to form a compressor-turbine rotor 20.

The axial flow compressor 12 and centrifugal compressor 16 form a compressor assembly which receives air from the inlet passage 22 and supplies compressed air to an annular diffuser passage 24 at the outlet of the centrifugal compressor 16. The outer end of the annular diffuser passage 24 turns axially toward the turbine end of the engine to supply the compressed air to an annular combustion apparatus comprising a housing 26. The annular combustion housing 26 is co-axially disposed on the turbine side of the compressor-turbine unit 20 and is axially spaced therefrom to form an annular chamber or passage 28 therebetween into which the combustion gases discharge. The chamber 28 is closed on its outer periphery by the walls of the diffuser passage 24 and communicates with the entrance to the centripetal turbine 18. The combustion gases discharging from the combustion assembly 26 into the space 28 flow through the turbine 18 to drive said turbine which in turn drives the centrifugal and axial-flow compressors 16 and 12.

The engine illustrated also includes a second turbine 30 of the axial-flow type which receives the gases discharging from the centripetal turbine 18 for driving said axial flow turbine. The turbine 30 is mounted on an output shaft 32 for furnishing output shaft power. From the turbine 30 the combustion gases discharge through the exhaust duct 34.

The annular combustion assembly housing 26 has axially spaced end walls 35 and 36. The wall 35 is a common wall between the combustion assembly and exhaust duct 34 and the wall 36 is a common wall between the combustion assembly and the annular chamber 28. The annular combustion housing 26 has an annular air inlet 38 on its outer side through which said chamber is supplied with air from the compressor discharge passage 24.

A plurality of elongate tubular combustion units 40 of arcuate shape are supported within the annular housing 26 so as to extend substantially circumferentially therein. The tubular combustion units are disposed in substantially end-to-end relation and so as to leave a space 42 between said units and the walls of the combustion housing 26. Three such combustion units 40 are illustrated. Obviously, however, the invention is not limited to any specific member of such units 40.

Figure 3:
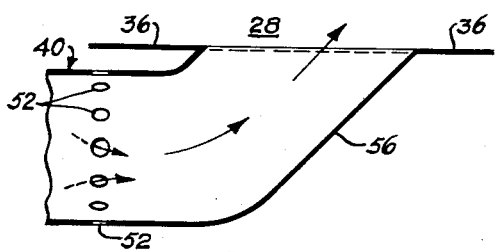
FIG. 3 is a sectional view taken along line 3—3 of FIG. 2.

Each tubular combustion unit 40 has a tubular construction and forms an inner wall or liner for a combustion chamber 44. The upstream end of each tubular combustion unit 40 has a baffle 46 extending thereacross. A fuel nozzle 48 is mounted at each baffle 46 for discharging fuel into the associated combustion chamber 44. A small amount of air enters each combustion chamber 44 through holes 50 in its upstream end baffle 46 for initial combustion with the fuel. A suitable igniter 51 is provided for each unit 40 for initiating combustion therein. The remaining air supplied to the combustion assembly space 42 enters the combustion chamber through holes 52 and passages 54 in each tubular combustion unit 40. Each tubular combustion unit 40 is made up of a plurality of tubular sections which overlap slightly to form the passages 54, the holes 52 being formed in the tubular wall of said sections. The downstream end 56 of each tubular unit 40 turns partly axially in a direction toward the centripetal turbine 18, as best seen in FIG. 3, and opens into the annular chamber 28 through the annular wall 36 so that the gases as they discharge into the chamber 28 have a circumferential component in the direction of their circumferential flow through the units 40.

With the structure described all the air supplied to the annular combustion assembly housing 26 enters the tubular combustion units 40 through the holes 50 and 52 and passages 54. The combustion gases discharge from each combustion unit 40 through their open discharge ends 56 into the annular chamber 28. From the chamber 28 the gases flow radially inwardly around the turbine entrance lip 60 into the turbine for driving said turbine.

Figure 2:
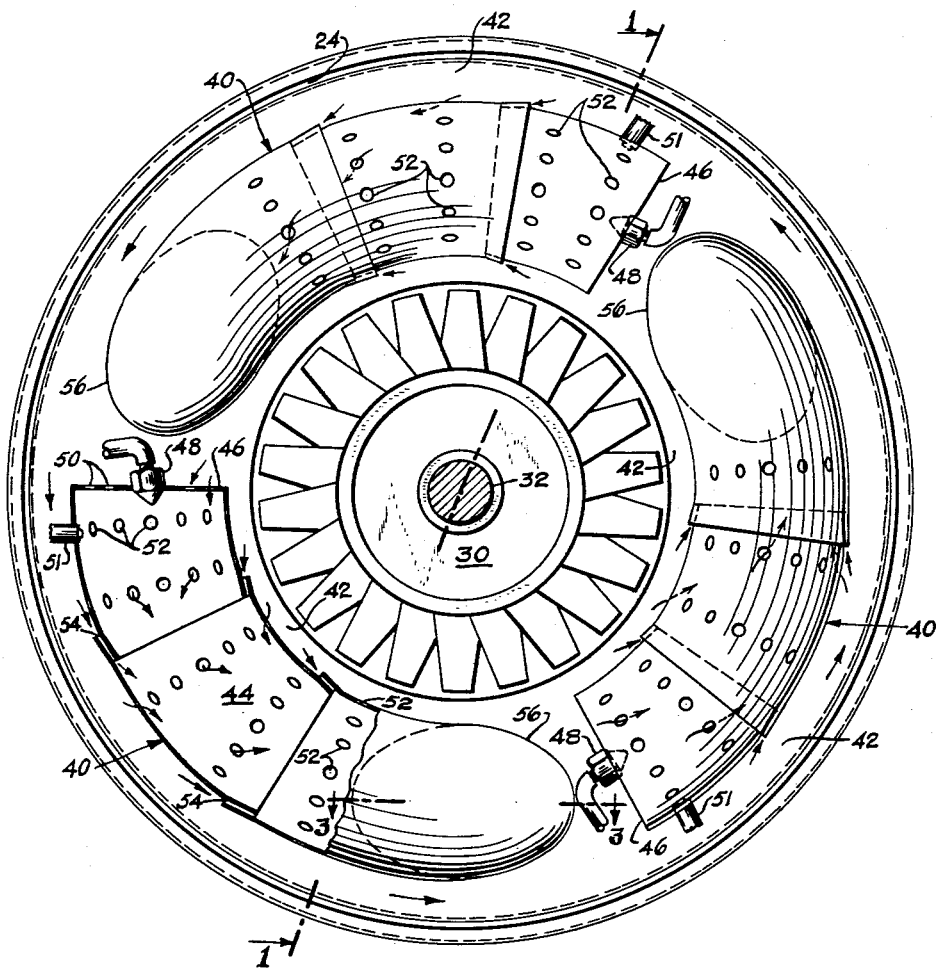
FIG. 2 is a sectional view, transverse to the engine axis, of the combustion chamber of the engine of FIG. 1 and taken along line 2—2 of FIG. 1.

The direction of rotation of the rotor 20 is such that air in the diffuser passage 24 has a swirl component in the circumferential direction of the combustion gas flow through the combustion chambers 44 of the combustion units 40 as indicated by the arrows in FIG. 2. Hence on discharging from the combustion units 40 through their discharge ends 56 into the annular chamber 28, the combustion gases will retain a swirl component in this direction.

With the foregoing construction the combustion assembly space 42 in effect forms part of the diffuser passage for the compressor 16. Also because of the circumferential flow of the combustion gases, the flow path of the combustion gases can be made quite long to insure substantially uniform temperatures across said flow path.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

In a gas turbine engine, having a centrifugal air compressor having a shaft mounted rotor, a centripetal turbine mounted downstream of said centrifugal compressor, said centripetal turbine having a rotor consisting of the reverse side of the rotor of said centrifugal compressor, a diffuser passage receiving compressed air from said centrifugal compressor, a drive shaft, an annular combustion chamber mounted coaxially with said drive shaft so as to receive compressed air from said diffuser passage, and exhaust means; the combination of a plurality of individually integral arcuate-shaped tubular combustion units disposed in substantially end to end relation within said chamber, each of said combustion units being spaced radially inwardly of the housing of the said combustion chamber, each of said tubular combustion units having air supply openings spaced around the circumference, along the full length and across one end of each of said combustion units, each of said combustion units comprising a plurality of overlapping tubular sections with intervening air passages, the larger sections being disposed progressively in the same rotary direction as that of said centrifugal compressor, each of said tubular combustion units having fuel supply and ignition means at the end having said air supply openings, the other end of each of said tubular combustion units forming a duct inclined away from the longitudinal axis of each of said combustion units through the surrounding combustion chamber so as to divert the gases from the combustion chamber without substantially hindering the rotary movement of the gases, said duct forming a streamlined elliptical junction of said combustion unit with the housing of said combustion chamber so as to gradually remove the obstruction of said tubular combustion unit as compressed air passes in its rotary movement to the next tubular combustion unit; and an annular passage receiving gases from the ducted end of said tubular combustion units and having deflecting means disposed to deflect gases into said centripetal turbine.

References Cited in the file of this patent
UNITED STATES PATENTS

| | | |
|---|---|---|
| 2,256,198 | Hahn | Sept. 16, 1941 |
| 2,567,079 | Owner et al. | Sept. 4, 1951 |
| 2,694,291 | Rosengart | Nov. 16, 1954 |
| 2,709,893 | Bigmann | June 7, 1955 |
| 2,809,493 | Pavlecka | Oct. 15, 1957 |
| 2,831,543 | Matthews | Apr. 22, 1958 |
| 2,855,754 | Giannotti | Oct. 14, 1958 |